(12) United States Patent
Kokemohr

(10) Patent No.: US 6,865,300 B2
(45) Date of Patent: Mar. 8, 2005

(54) USER DEFINABLE IMAGE REFERENCE POINTS

(75) Inventor: Nils Kokemohr, Hamburg (DE)

(73) Assignee: Nik Multimedia, Inc., San Diego, CA (US)

( * ) Notice: Subject to any disclaimer, the term of this patent is extended or adjusted under 35 U.S.C. 154(b) by 0 days.

(21) Appl. No.: 10/824,664

(22) Filed: Apr. 13, 2004

(65) Prior Publication Data

US 2004/0197027 A1 Oct. 7, 2004

Related U.S. Application Data

(62) Division of application No. 10/280,897, filed on Oct. 24, 2002, now Pat. No. 6,728,421.
(60) Provisional application No. 60/336,498, filed on Oct. 24, 2001.

(51) Int. Cl.[7] .............................. G06K 9/36; G06K 9/03
(52) U.S. Cl. ....................................... 382/260; 382/284
(58) Field of Search ................................ 382/162, 165, 382/214, 219, 220, 221, 260, 284; 345/619, 629, 630, 650; 358/1.9, 296, 401, 443, 450

(56) References Cited

U.S. PATENT DOCUMENTS

| | | | | |
|---|---|---|---|---|
| 4,881,130 A | * | 11/1989 | Hayashi ...................... 358/443 |
| 5,309,245 A | * | 5/1994 | Hayashi et al. ............. 358/296 |
| 5,404,439 A | | 4/1995 | Moran et al. ................ 395/155 |
| 5,412,767 A | | 5/1995 | Long ........................... 395/133 |
| 5,425,137 A | | 6/1995 | Mohan et al. ............... 395/133 |
| 5,436,733 A | * | 7/1995 | Terada et al. ............... 358/448 |
| 5,459,586 A | * | 10/1995 | Nagasato et al. ............ 358/450 |
| 5,465,160 A | * | 11/1995 | Kamo et al. ................ 358/401 |
| 5,471,572 A | | 11/1995 | Buchner et al. ............. 395/139 |
| 5,473,740 A | | 12/1995 | Kasson ........................ 395/134 |
| 5,489,921 A | | 2/1996 | Dorff et al. ................. 345/153 |
| 5,548,705 A | | 8/1996 | Moran et al. ................ 395/159 |
| 5,586,239 A | | 12/1996 | Ueda ........................... 395/774 |
| 5,611,027 A | | 3/1997 | Edgar .......................... 395/131 |
| 5,617,114 A | | 4/1997 | Bier et al. ................... 345/113 |
| 5,684,509 A | | 11/1997 | Hatanaka et al. ........... 345/138 |
| 5,734,761 A | * | 3/1998 | Bagley ........................ 382/309 |
| 5,818,455 A | | 10/1998 | Stone et al. ................. 345/433 |
| 5,877,772 A | | 3/1999 | Nomura et al. ............. 345/431 |
| 5,923,792 A | * | 7/1999 | Shyu et al. .................. 382/309 |
| 5,949,429 A | | 9/1999 | Bonneau et al. ............ 345/433 |
| 6,038,348 A | | 3/2000 | Carley ......................... 382/268 |
| 6,043,824 A | | 3/2000 | Bier ............................. 345/435 |
| 6,072,501 A | * | 6/2000 | Bier ............................. 345/629 |
| 6,130,676 A | | 10/2000 | Wise et al. .................. 345/433 |
| 6,201,548 B1 | * | 3/2001 | Cariffe et al. ............... 345/620 |
| 6,249,353 B1 | * | 6/2001 | Yoshida et al. .............. 358/1.9 |

* cited by examiner

Primary Examiner—Andrew W. Johns
Assistant Examiner—Amir Alavi
(74) Attorney, Agent, or Firm—Robert J. Rose; Sheldon & Mak

(57) ABSTRACT

A method for image processing of a digital image comprising the steps of determining one or more sets of pixel characteristics; determining for each pixel characteristic set, an image processing filter; providing a mixing function algorithm embodied on a computer-readable medium for modifying the digital image; and processing the digital image by applying (22) the mixing function algorithm based on the one or more pixel characteristic sets and determined image processing filters. Various mixing function algorithms are described. An application program interface embodied on a computer-readable medium comprising a first interface to receive the coordinates of the image reference points, and a second interface to receive assignment of the image processing filter is also provided. The application program interface may represent the image reference points by a graphic tag (10).

39 Claims, 5 Drawing Sheets

USER DEFINABLE IMAGE REFERENCE POINTS

CROSS-REFERENCE TO RELATED APPLICATIONS

The present Application is a division of U.S. patent application Ser. No. 10/280,897, filed Oct. 24, 2002, now U.S. Pat. No. 6,728,421, titled "User Definable Image Reference Points", which claims the benefit of U.S. Provisional Patent Application No. 60/336,498 titled "User Definable Image Reference Points" filed Oct. 24, 2001, the content of which is incorporated by reference in this disclosure in its entirety.

BACKGROUND

The present invention relates to an application program interface and methods for combining any number of arbitrarily selected image modifications in an image while assigning those modifications easily to an image area and/or image color to provide for optimally adjusting color, contrast, sharpness, and other image-editing functions in the image-editing process.

It is a well-known problem to correct color, contrast, sharpness, or other specific digital image attributes in a digital image. It is also well-known to those skilled in image-editing that it is difficult to perform multiple color, contrast, and other adjustments while maintaining a natural appearance of the digital image.

At the current stage of image-editing technology, computer users can only apply relatively basic functions to images in a single action, such as increasing the saturation of all pixels of an image, removing a certain colorcast from the entire image, or increasing the image's overall contrast. Well-known image-editing tools and techniques such as layer masks can be combined with existing image adjustment functions to apply such image changes selectively. However, current methods for image editing are still limited to one single image adjustment at a time. More complex tools such as the Curves functions provided in image editing programs such as Adobe Photoshop® provide the user with added control for changing image color, but such tools are difficult to apply, and still very limited as they apply an image enhancement globally to the image.

Additional image editing tools also exist for reading or measuring color values in the digital image. In its current release, Adobe Photoshop® offers a feature that enables the user to place and move up to four color reference points in an image. Such color reference points read properties (limited to the color values) of the image area in which they are placed. It is known to those skilled in the art that the only purpose of such color reference points is to display the associated color values; there is no image operation associated with such reference points. The reference points utilized in image-editing software are merely offered as a control tool for measuring an image's color values at a specific point within the image.

In other implementations of reference points used for measuring color in specific image regions, image-editing applications such as Adobe Photoshop®, Corel Draw®, and Pictographics iCorrect 3.0®, allow the user to select a color in the image by clicking on a specific image point during a color enhancement and perform an operation on the specific color with which the selected point is associated. For example, the black-point adjustment in Adobe Photoshop® allows the user to select a color in the image and specify the selected color as black, instructing the software to apply a uniform color operation to all pixels of the image, so that the desired color is turned into black. This method is not only available for black-point operations, but for pixels that are intended to be white, gray (neutral), skin tone, or sky, etc.

While each of these software applications provide methods for reading a limited number of colors and allow for one single operation which is applied globally and uniformly to the image and which only applies one uniform color cast change based on the read information, none of the methods currently used allow for the placement of one or more graphical representations of image reference points (IRPs) in the image that can read color or image information, be assigned an image editing function, be associated with one or more image reference points (IRPs) in the image to perform image-editing functions, be moved, or be modified by the user such that multiple related and unrelated operations can be performed.

What is needed is an application program interface and methods for editing digital images that enable the user to place multiple, arbitrary reference points in a digital image and assign image-editing functions, weighted values or any such combinations to enable multiple image-editing functions to be applied to an image.

SUMMARY

The present invention meets this need by enabling users to perform such complex image-editing operations easily by performing multiple, complex image enhancements in a single step. A method is described that allows the user to place a plurality of Image Reference Points [IRPs] in a digital image, assign an image-editing function to each IRP, and alter each image-editing function based on the desired intensity, effect, and its effect relative to other IRPs placed in the image, via any one of a variety of interface concepts described later in this disclosure.

A method for image processing of a digital image is disclosed comprising the steps of determining one or more sets of pixel characteristics; determining for each pixel characteristic set, an image editing function; providing a mixing function algorithm embodied on a computer-readable medium for modifying the digital image; and processing the digital image by applying the mixing function algorithm based on the one or more pixel characteristic sets and determined image editing functions. In one embodiment, the mixing function algorithm comprises a difference function. Optionally, the difference function algorithm calculates a value based on the difference of between pixel characteristics and one of the one or more determined pixel characteristic sets. In another embodiment, the mixing function algorithm includes a controlling function for normalizing the calculations.

In a further embodiment, the method adds the step of determining for each pixel characteristic set, a set of weighting values, and the processing step further comprises applying the mixing function algorithm based on the determined weighting value set.

In a further embodiment, a first pixel characteristic set is determined, and at least one characteristic in the first pixel characteristic set is location dependent, and at least one characteristic in the first pixel characteristic set is either color dependent, or structure dependent, or both. Alternatively, a first pixel characteristic set is determined, and at least two different characteristics in the first pixel characteristic set are from the group consisting of location dependent, color dependent, and structure dependent.

A method for processing of a digital image comprising the steps of receiving the coordinates of one or more than one image reference point defined by a user within the digital image; receiving one or more than one image editing function assigned by the user and associated with the coordinates of the one or more than one defined image reference point; providing a mixing function algorithm embodied on a computer-readable medium for modifying the digital image; and processing the digital image by applying the mixing function algorithm based on the one or more than one assigned image editing function and the coordinates of the one or more than one defined image reference point.

The method may optionally further comprise displaying a graphical icon at the coordinates of a defined image reference point.

A mixing function algorithm suitable to the invention is described, and exemplar alternative embodiments are disclosed, including a group consisting of a Pythagoras distance approach which calculates a geometric distance between each pixel of the digital image to the coordinates of the one or more than one defined image reference point, a color curves approach, a segmentation approach, a classification approach, an expanding areas approach, and an offset vector approach. Optionally, the segmentation approach comprises multiple segmentation, and additionally optionally the classification approach adjusts for similarity of pixel attributes. The mixing function algorithm may optionally operate as a function of the calculated geometric distance from each pixel of the digital image to the coordinates of the defined image reference points.

Optionally, the disclosed method further comprises receiving one or more assigned image characteristics associated with the coordinates of a defined image reference point, and wherein the mixing function algorithm calculates a characteristic difference between the image characteristics of a pixel of the digital image and the assigned image characteristics. The mixing function algorithm may also calculate a characteristic difference between the image characteristics of a pixel and the image characteristics of one or more pixels neighboring the coordinates of one or more defined image reference point.

Additionally, optionally other steps may be added to the method. For example, the method may further comprise receiving one or more weighting values, and the processing step further comprising applying the mixing function algorithm based on weighting values; or further comprise receiving one or more regions of interest associated with the coordinates of one or more defined image reference point; or further comprise the step of providing an application program interface comprising a first interface to receive the coordinates of the one or more defined image reference points, and a second interface to receive the one or more assigned image editing functions.

A method for processing of a digital image comprising pixels having image characteristics is disclosed comprising the steps defining the location of image reference points within the digital image; determining image editing functions; and processing the digital image by applying the determined image editing functions based upon either the location of the defined image reference points, or the image characteristics of the pixels at the location of the defined image reference points, or both.

A method for image processing of a digital image is also disclosed comprising the steps of providing one or more than one image processing filter; setting the coordinates of one or more than one image reference point within the digital image; providing a mixing function algorithm embodied on a computer-readable medium for modifying the digital image; and processing the digital image by applying the mixing algorithm based on the one or more than one image processing filter and the coordinates of the one or more than one set image reference point. Optionally, various filters may be used, including but not limited to a noise reduction filter, a sharpening filter, or a color change filter.

An application program interface is provided embodied on a computer-readable medium for execution on a computer for image processing of a digital image, the digital image comprising pixels having image characteristics, comprising a first interface to receive the coordinates of each of a plurality of image reference points defined by a user within the digital image, and a second interface to receive an image editing function assigned by the user and associated with either the coordinates of each of the plurality of defined image reference points, or the image characteristics of one or more pixels neighboring the coordinates of each of the plurality of defined image reference points.

In a further embodiment, the second interface is to receive an image editing function assigned by the user and associated with both the coordinates of each of the plurality of defined image reference points, and the image characteristics of one or more pixels neighboring the coordinates of each of the plurality of defined image reference points.

In a further alternative optional embodiment, the program interface further comprises a third interface that displays a graphical icon at the coordinates of one or more than one of the plurality of defined image reference points. Additionally optionally, the third interface permits repositioning of the graphical icon.

In further embodiments, the program interface further comprises a fourth interface that displays the assigned image editing function. The second interface may further receive an image area associated with the coordinates of one or more than one of the plurality of defined image reference points. The second interface may further receive a color area associated with the coordinates of one or more than one of the plurality of defined image reference points.

A further embodiment of an application program interface is disclosed, embodied on a computer-readable medium for execution on a computer for image processing of a digital image, the digital image comprising pixels having image characteristics, comprising a first interface to receive the coordinates of an image reference point defined by a user within the digital image, and a second interface to receive an image editing function assigned by the user and associated with both the coordinates of the defined image reference point, and the image characteristics of one or more pixels neighboring the coordinates of the defined image reference point.

BRIEF DESCRIPTION OF THE DRAWINGS

These and other features, aspects, and advantages of the present invention will become better understood with reference to the following description, illustrations, equations, appended claims, and accompanying drawings where:

DETAILED DESCRIPTION

The method and program interface of the present invention is useable as a plug-in supplemental program, as an independent module that may be integrated into any commercially available image processing program such as Adobe Photoshop®, or into any image processing device that is capable of modifying and displaying an image, such as a color copier or a self service photo print kiosk, as a dynamic library file or similar module that may be implemented into other software programs whereby image measurement and modification may be useful, or as a stand alone software program. These are all examples, without limitation, of image processing of a digital image. Although embodiments of the invention which adjust color, contrast, noise reduction, and sharpening are described, the present invention is useful for altering any attribute or feature of the digital image.

Furthermore, it will become clear with regard to the current invention that the user interface for the current invention may have various embodiments, which will become clear later in this disclosure.

The Application Program Interface

The user interface component of the present invention provides methods for setting IRPs in an image. Those skilled in the art will find that multiple methods or implementations of a user interface are useful with regard to the current invention.

Figure 1:
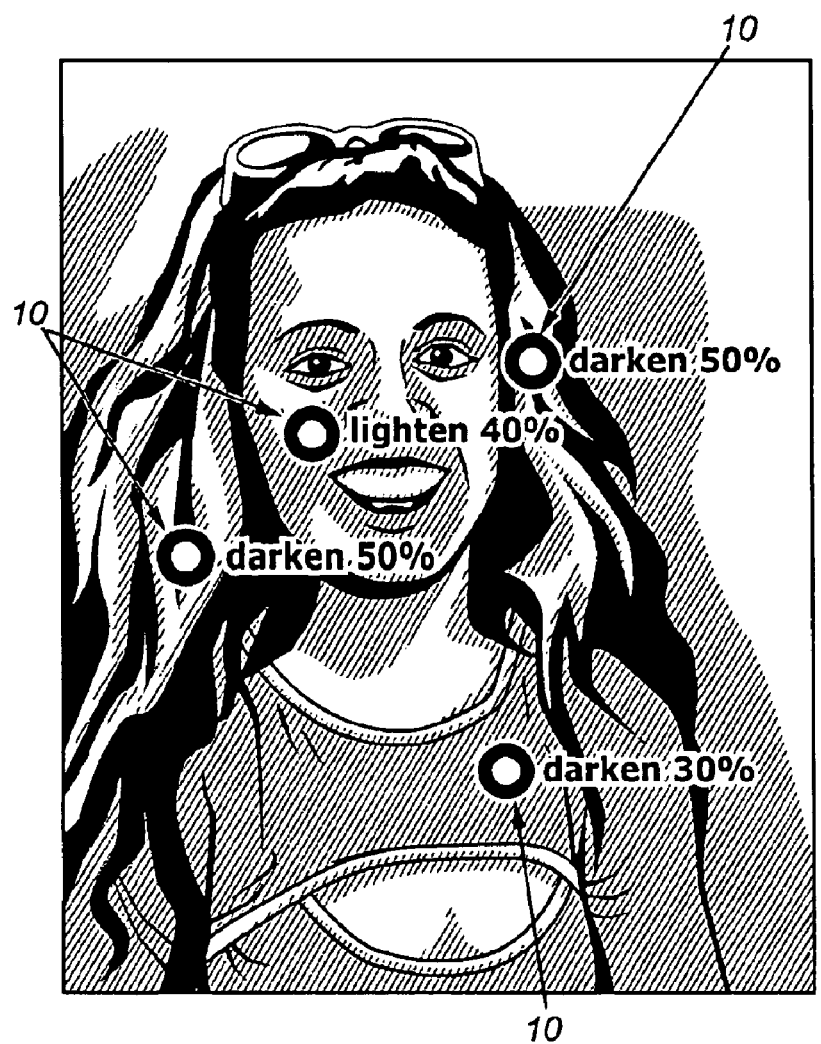
FIG. 1 is a screen shot of a digital image in an image processing program, illustrating one embodiment useable in the application program interface of the present invention.

In one preferred embodiment of a user interface, an implementation of the present invention allows the user to set a variety of types of IRPs in an image, which can be shown as graphic tags 10 floating over the image, as shown in FIG. 1. FIG. 1 is a screen shot of a digital image in an image processing program.

This method enables the user to move the IRPs in the image for the purpose of adjusting the location of such IRPs and thus the effect of each IRP on the image.

Figure 2:
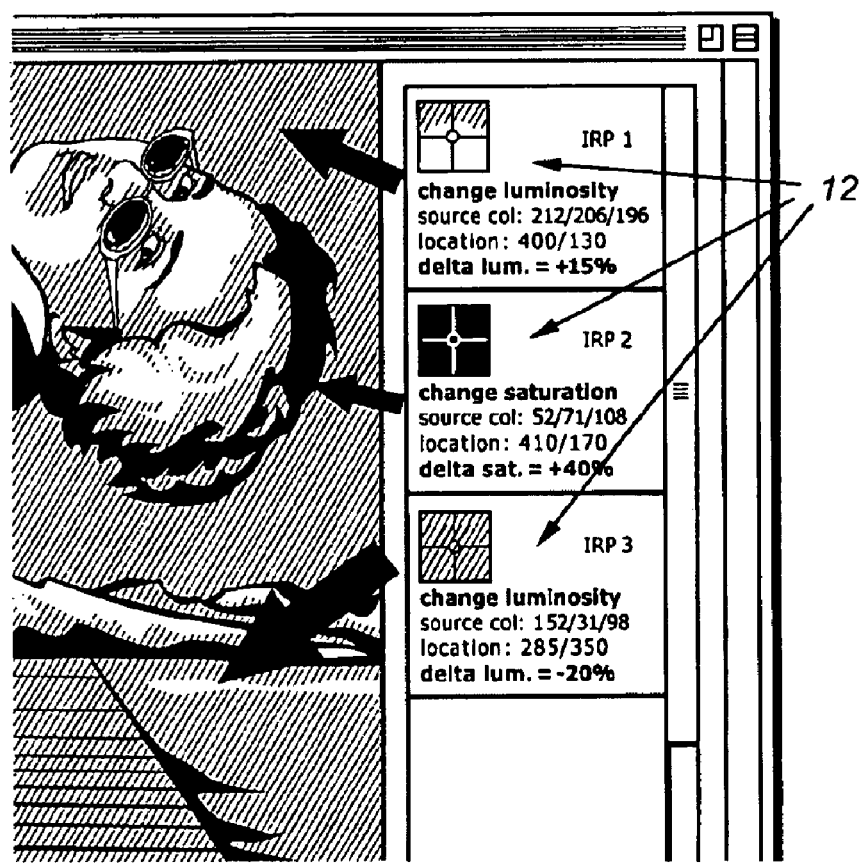
FIG. 2 is a screen shot of a digital image in an image processing program, illustrating another embodiment useable in the application program interface of the present invention.

In another preferred embodiment, IRPs could be invisible within the preview area of the image and identified placed elsewhere as information boxes 12 within the interface, as shown in FIG. 2, but associated with a location (shown by arrow). In this embodiment of the user interface, graphic tags 10 do not "float" over the image as in FIG. 1. However, as it will become clear later in this disclosure that it is the location that Image Reference Points [IRPs] identifies and the related function that are significant, and that the graphical representations of the IRPs are useful as a convenience to the user to indicate the location of the IRP function. (FIG. 2 is a screen shot of a digital image in an image processing program.)

In both FIG. 1 and FIG. 2, the IRPs serve as a graphical representation of an image modification that will be applied to an area of the image.

The application program interface is embodied on a computer-readable medium for execution on a computer for image processing of a digital image. A first interface receives the coordinates of each of a plurality of image reference points defined by a user within the digital image, and a second interface receives an image editing function assigned by the user and associated with either the coordinates of each of the plurality of defined image reference points, or the image characteristics of one or more pixels neighboring the coordinates of each of the plurality of defined image reference points.

In a further embodiment, the second interface receives an image editing function assigned by the user and associated with both the coordinates of each of the plurality of defined image reference points, and the image characteristics of one or more pixels neighboring the coordinates of each of the plurality of defined image reference points.

In a further alternative optional embodiment, a third interface displays a graphical icon or graphical tag 10 at the coordinates of one or more than one of the plurality of defined image reference points. Additionally optionally, the third interface permits repositioning of the graphical icon.

In further embodiments, a fourth interface displays the assigned image editing function. The second interface may further receive an image area associated with the coordinates of one or more than one of the plurality of defined image reference points. The second interface may further receive a color area associated with the coordinates of one or more than one of the plurality of defined image reference points.

In an alternative embodiment, the first interface receives the coordinates of a single image reference point defined by a user within the digital image, and the second interface receives an image editing function assigned by the user and associated with both the coordinates of the defined image reference point, and the image characteristics of one or more pixels neighboring the coordinates of the defined image reference point.

Mixing Functions

A central function of the present invention is the "Mixing Function," which modifies the image based on the values and settings of the IRPs and the image modifications associated with the IRPs. With reference to this disclosure, a "Mixing Function" is an algorithm that defines to what extent a pixel is modified by each of the IRPs and its related image modification function.

It will be evident to those skilled in the art that there are many possible mixing functions, as will be shown in this disclosure.

Figure 3:
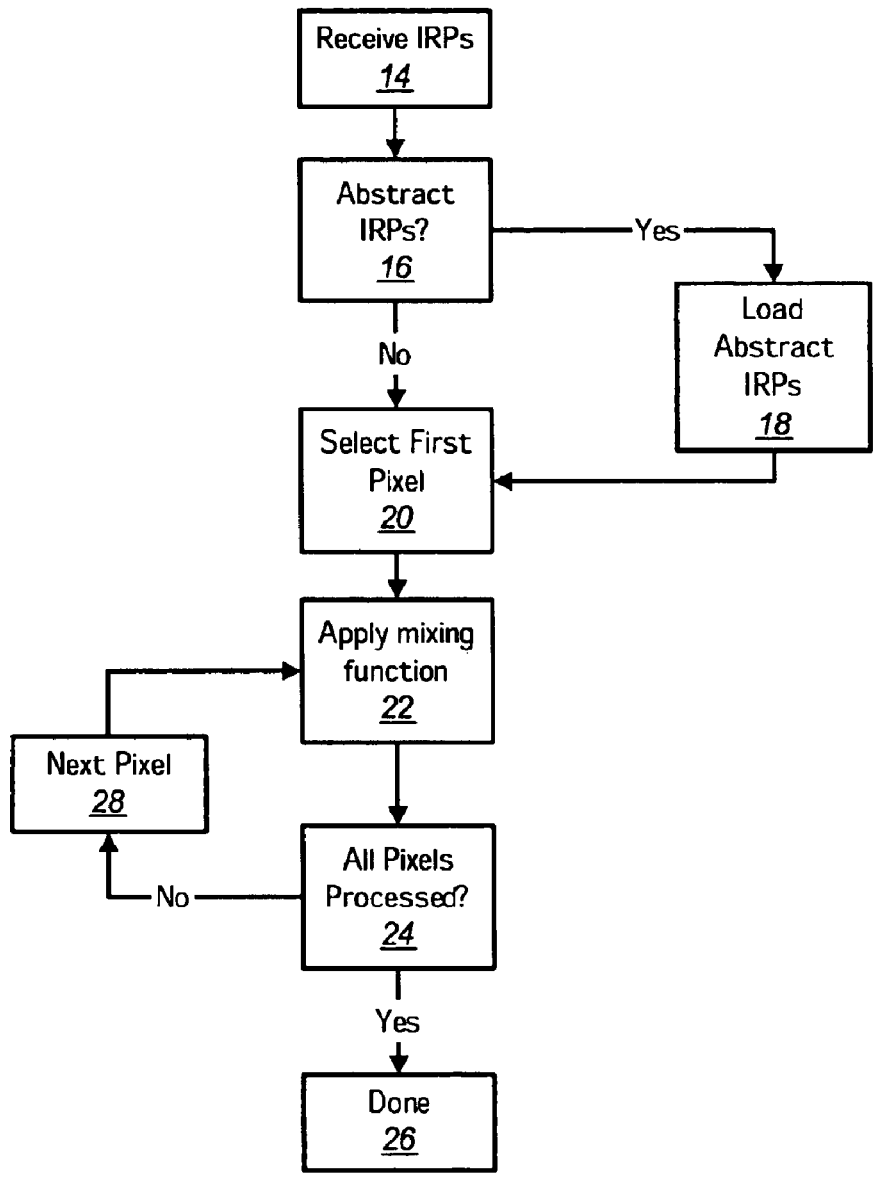
FIG. 3 is a flow chart of the steps of the application of a mixing function in accord with the disclosure.

The method for applying the mixing function is shown in FIG. 3. Begin with receiving 14 the IRPs in the image; test 16 to determine whether abstract IRPs are being used. If so, load 18 the abstract IRPs and then select 20 the first pixel to be processed; if not select 20 the first pixel to be processed. Then apply 22 the mixing function according to this disclosure, and test 24 whether all pixels chosen to be processed have been processed. If so, the method is completed 26, if not, the next pixel is selected 28 and step 22 is repeated.

Using the Pythagoras Distance Approach

In one embodiment of the mixing function, the Pythagoras equation can be used. Those skilled in the art will find that this is more suitable for IRPs that are intended to perform local color correction or similar changes to an image.

In step 22, apply the image modification to a greater extent, if the location of the IRP is close to that of the current pixel, or apply it to a lesser extent, if the location of the IRP is further away from the current pixel, using the Pythagoras equation to measure the distance, often also referred to as distance in Euclidian space.

Using Color Curves

In another embodiment, a mixing function could be created with the use of color curves. To create the function:

Step 22.1.1. Begin with the first channel of the image (such as the Red channel).

Step 22.1.2. All IRPs will have an existing brightness which is the brightness of the actual channel of the pixel where the IRP is located, and a desired brightness, which is the brightness of the actual channel of the same pixel after the image modification associated with its IRP has been applied. Find the optimal polynomial function that matches these values. For example, if the red channel has an IRP on a pixel with a value of 20, which changes the pixel's value to 5, and there is a second IRP above a pixel with the value of 80, which changes that channel luminosity to 90, all that is needed is to find a function that meets the conditions f(20)=5 and f(80)=90.

Step 22.1.3. Apply this function to all pixels of the selected channel.

Step 22.1.4. If all channels have not been modified, select the next channel and proceed with step 22.1.2.

Using Segmentation to Create the Mixing Function

In a further embodiment, the mixing function can be created using segmentation. To create the function:

Step 22.2.1. Segment the image using any appropriate segmentation algorithm.

Step 22.2.2. Begin with IRP 1.

Step 22.2.3. Apply the filter associated with that IRP to the segment where it is located.

Step 22.2.4. Select the next IRP.

Step 22.2.5. Unless all IRPs have been processed, proceed with step 22.2.3.

If there is a segment that contains two IRPs, re-segment the image with smaller segments, or re-segment the area into smaller segments.

Using Multiple Segmentations

In a still further embodiment of the current invention, the mixing function can be created using multiple segmentation. To create the function:

Step 22.3.1. Make "n" different segmentations of the image, e.g., n=4, where the first segmentation is rougher, (having few but larger segments), and the following segmentations are finer, (using more by smaller segments per image).

Step 22.3.2. Begin with IRP 1.

Step 22.3.3. Apply the image modification of that IRP at 1/nth opacity to all pixels in the segment that contains the current IRP of the first segmentation, then apply the image modification at 1/nth opacity to all pixels in the segment containing the IRP of the second segmentation. Continue for all n segmentations.

Step 22.3.4. Select the next IRP.

Step 22.3.5. Unless all IRPs have been processed, proceed with step 22.3.3.

Those skilled in the art will know that several segmenting algorithms may be used, and the "roughness" (size of segments) within the equation can be defined by a parameter.

Using a Classification Method

A classification method from pattern recognition science may be used to create another embodiment of the mixing function. To create the function:

Step 22.4.1. Choose a set of characteristics, such as saturation, x-coordinate, y-coordinate, hue, and luminance.

Step 22.4.2. Using existing methods of pattern recognition, classify all pixels of the image, i.e., every pixel is assigned to an IRP based on the characteristics, and assuming that the IRPs are centers of clusters.

Step 22.4.3. Modify each pixel with the image modification associated with the IRP to which the pixel has been classified.

Using a "Soft" Classification Method

In an even further embodiment of the current invention, it may be useful to modify the classification method to adjust for similarity of pixel attributes.

Typically, a pixel will not match the attributes of one IRP to a degree of 100%. One pixel's attributes might, for example, match one IRP to 50%, another IRP to 30% and a third IRP only to 20%. In the current embodiment using soft classification, the algorithm would apply the effect of the first IRP to a degree of 50%, the second IRP's effect at 30%, and the third IRP's effect to 20%. By utilizing this "Soft" Classification, one pixel is not purely associated with the most similar IRP.

One preferred embodiment that is described in detail later in this disclosure will show an implementation that follows a similar concept as described here.

Using an Expanding Areas Method

In another embodiment of the mixing function, an expanding areas method could be used to create a mixing function. To create the function:

Step 22.5.1. Associate each IRP with an "area" or location within the image. Initially, this area is only the pixel where the IRP is positioned.

Step 22.5.2. Apply the following to all IRP areas: Consider all pixels that touch the area. Among those, find the one whose attributes (color, saturation, luminosity) are closest to the initial pixel of the area. While comparing the attributes, minimize for the sum of differences of all attributes. Add this pixel to the area and assign the current area size in pixels to it. The initial pixel is assigned with a value of 1, the next added pixel is assigned a value of 2, the next with a value of 3, etc., until each pixel has been assigned a value.

Step 22.5.3. Repeat step 22.5.2 until all areas have expanded to the full image size.

Step 22.5.4. Apply all modifications of all IRPs to that pixel while increasing the application for those with smaller values.

One Preferred Mixing Function

In one preferred embodiment, a mixing function uses a set of attributes for each pixel (luminosity, hue, etc.). These attributes are compared to the attributes of the area where an IRP is positioned, and the Mixing Function applies those IRPs image modifications more whose associated attributes are similar to the actual pixel, and those IRPs image modifications less whose associated characteristics are very different from the actual pixel.

Unless otherwise specified, capitalized variables will represent large structures (such as the image I) or functions, while non-capitalized variables refer to one-dimensional, real numbers.

Definition of the Key Elements

A "Pixel-Difference-Based IRP Image Modification," from now on called an "IRP Image Modification," may be represented by a 7-tuple, as shown in Equation 1, where m is the amount of IRPs that will be made use of, and the number n is the amount of analyzing functions as explained later.

$$(F_{1\ldots m}, R_{1\ldots m}, I, A_{1\ldots n}, D, V, C_{1\ldots m}) \quad [1]$$

The first value, $F_{1\ldots m}$ is a set of the "Performing Functions." Each of these functions is an image modification function, which may be called with three parameters as shown in Equation 2.

$$I'_{xy} = F(I, x, y) \quad [2]$$

In Equation 2 the result $I'_{xy}$ is the pixel that has been calculated by F. I is the image on which F is applied, and x and y are the coordinates of the pixel in I that F is applied to. Such a performing function could be "darken pixels by 30%," for example, as shown in FIG. 1. In image science, these modifications are often called filters.

The second value in Equation 1, $R_{1...m}$ is a number of m tuples. Each tuple represents values of an IRP, and is a set of pixel characteristics. Such a tuple R consists of $2*n+1$ values, as in Equation [3].

$$((g_1 \ldots g_n), g^*, (w_1 \ldots w_n)) \qquad [3]$$

$F_{1...m}$ and $R_{1...m}$ together represent the IRPs that the user has created. I will explain later how the IRPs that the user has placed can be converted into the functions and values $F_{1...m}$ and $R_{1...m}$. Later in this disclosure I indicate that a function F and a tuple R are "associated" with each other and with an IRP if they F and R together represent an IRP.

The third value I in Equation 1 is the image with the pixels $I_{xy}$. This image can be of any type, i.e., grayscale, Lab, CMYK, RGB, or any other image representation that allows Performing Functions (Equation [2]) or analyzing functions (Equation [4]) to be performed on the image.

The fourth element $A_{1...n}$ in Equation 1 is a set of n "Analyzing Functions" as represented in Equation [4].

$$A_n(I,x,y)=k \qquad [4]$$

These functions, unlike the Performing Functions F, calculate a single real number k for each pixel. These functions extract comparable attributes out of the image, such as saturation, luminance, horizontal location or vertical location, amount of noise in the region around the coordinates x, y, and so forth. The number n is the amount of Analyzing Functions.

The function's results need to be comparable. That is, the difference of the results of two different pixels applied to the same Analyzing Function can be represented by a number. For example, if $p_1$ is a dark pixel and $p_2$ is a bright pixel, and A is a function that calculates the luminance of a pixel, then $|A(p_1)-A(p_2)|$ is an easy measure for the luminosity difference of both pixels. Note: Analyzing Functions in this disclosure refer to functions that calculate characteristics of an image, and must not be confused with the mathematical term "analytic functions." The result of an Analyzing Function applied to a pixel will for further reference in this disclosure be called a "Characteristic" of the pixel.

The Analyzing Functions can analyze the color of a point x, y in the image I, the structure of the point x, y in the image I, and the location of a point x, y in the image I itself.

Later in this disclosure I refer to "Color Analyzing Functions," "Structure Analyzing Functions" and "Location Analyzing Functions." Color Analyzing Functions are any functions on the pixel's values itself, such as r, g and b, while Structure Analyzing Functions also take the values and differences of a group of pixel around the point x, y into account, and Location Analyzing Functions are any functions on x and y.

For example, the Analyzing Function $A(I, x, y)=x+y$ is a Location Analyzing Function of the pixel. An example of a Color Analyzing Function would be $A(I, x, y)=I_{xy(r)}+I_{xy(g)}+I_{xy(b)}$, where r, g and b refer to the RGB channels of the image. An example of a Structure Analyzing Function would be $A(I, x, y)=I_{xy(r)}-I_{(x+1)y(r)}$. Note: These three categories of Analyzing Functions are not disjoint. For example, the function $A(I,x,y)=I_{xy(r)}-I_{(x+1)(y-2)(g)}+x$ is a Color Analyzing Function, a Structure Analyzing Function, and a Location Analyzing Function simultaneously.

"Normalizing" the Analyzing Functions and limiting the range of possible values such that their results have approximately the range of 0 . . . 100 will simplify the process.

The fifth element D in Equation 1 is a "Difference Function" which can compare two vectors of n values against each other and provides a single number that is larger the more the two vectors of n values differ and zero if the two sets of n numbers are identical. In doing so, the function D is capable of weighing each individual number of the two sets with a weight vector $(w_{1...n})$ as in Equation [5].

$$d=D((a_{1...n}), (b_{1...n}), (w_{1...n})) \qquad [5]$$

D is defined as follows:

$$D(a_{1...n}), (b_{1...n}), (w_{1...n}))=\|(a_1{}^*w_1-b_1{}^*w_1), \ldots, (a_1{}^*w_n-b_n{}^*w_n)\| \qquad [6]$$

where $\|\cdot\|$ refers to any norm, such as the distance in Euclidian space, which is also known as $\|\cdot\|_2$.

In other words, the more $a_{1...n}$ and $b_{1...n}$ differ, the higher the result of the Difference Function D, while the weights $w_{1...n}$ control the importance of each element of the vectors of a and b. By setting elements of w to zero, D will disregard the according elements of a and b.

Suitable Difference Functions in this implementation are:

$$D((a_{1...n}), (b_{1...n}), (w_{1...n}))=|a_1-b_1|^*w_1+|a_2-b_2|^*w_2+ \ldots +|a_n-b_n|^*w_n \qquad [7]$$

$$D((a_{1...n}), (b_{1...n}), (w_{1...n}))^2=(a_1{}^*w_1-b_1{}^*w_1)^2+ \ldots +(a_n{}^*w_n-b_n{}^*w_n)^2 \qquad [8]$$

The weighed Pythagoras function [8] leads to better results than the simple function [7], while function [8] provides for accelerated processing. To those skilled in the art, the norms used in [7] and [8] may also be known as $\|\cdot\|_1$ and $\|\cdot\|_2$.

A function D* that is derived from the function D is defined as follows:

$$D^*((a_{1...n}), (b_{1...n}), (w_{1...n}), g^*)=D((a_{1...n}), (b_{1...n}), (w_{1...n}))+g^* \qquad [9]$$

In other words: D* measures the difference of $a_{1...n}$ and $b_{1...n}$, weighed with $w_{1...n}$, and adds the real number g* to the result.

For accelerated performance or for simpler implementation, another Difference Function $\overline{D}$ or $\overline{D}^*$ can be made use of which does not utilize weights. Systems as described in this disclosure that do not utilize weights are easier to use and faster to compute, but less flexible. $\overline{D}$ and $\overline{D}^*$ are defined as follows:

$$\overline{D}((a_{1...n}), (b_{1...n}))=D((a_{1...n}), (b_{1...n}), (1,1,\ldots,1)) \qquad [10]$$

$$\overline{D}^*((a_{1...n}), (b_{1...n}), g^*)=D^*((a_{1...n}), (b_{1...n}), (1,1,\ldots,1), g^*) \qquad [11]$$

The sixth element, V, in Equation 1 is an "Inversion Function" that has the following characteristics with $V: \mathbb{R}_0^{30} \to \mathbb{R}^+$:

$V(x)>0$ for all $x \geq 0$ $V(y)<V(x)$ for all $x<y$ for all $x, y \geq 0$ $\lim x \to \infty$ of $V(x)=0$.

The Gaussian bell curve or $V(x)=1/(x+0.001)$ are such functions. Note: $V(x)=1/x$ is not appropriate as the result of $V(0)$ would not be defined.

In one preferred embodiment, the function in Equation [12] is used, where t is any number that is approximately between 1 and 1000. The value t=50 is a good value to start with, if the Analyzing Functions are normalized to a range of 0 . . . 100 as referred to in the section on "Normalizing Analyzing Functions" that follows equation [4] in this disclosure.

$$V(x)=0.5^{(x/t)} \qquad [12]$$

The Inversion function will be used later in this disclosure to calculate an "Inverse Difference" between two tuples $a_{1...n}$ and $b_{1...n}$ by calculating $V(D^*((a_{1...n}), (b_{1...n}), (w_{1...n}), g^*))$ or $V(D((a_{1...n}), (b_{1...n}), (w_{1...n})))$ or $V(\overline{D}^*((a_{1...n}), (b_{1...n}), g^*))$ or $V(\overline{D}((a_{1...n}), (b_{1...n})))$. The purpose of this Inverse Difference is to provide a high value if similarity between the tuples $a_{1...n}$ and $b_{1...n}$ is detected, and a low value, if the tuples $a_{1...n}$ and $b_{1...n}$ are different.

The seventh element, $C_{1...m}$, in equation [1] is a set of m "Controlling Functions". Each of those Controlling Functions has m parameters and needs to suit the following conditions:

$C_i(p_1 ... p_m) \geq 0$ for all $p_1 ... p_m$ and for all $1 \leq i < m$ (all $p_1 ... p_m$ $C_i(p_1 ... p_m)$ is high if $p_i$ has a high value compared to the mean of $p_1 ... p_m$ $C_i(p_1 ... p_m)$ is low if $p_i$ has a low value compared to the mean of $p_1 ... p_m$ $C_1 + C_2 + ... + C_m$ is always 1.

$C_i(p_1 ... p_m) = C_{II(i)}(p_{II(1)} ... p_{II(m)})$ with II being any permutation $II:(1 ... m) \rightarrow (II(1) ... II(m))$.

A recommended equation for such a controlling function would be as shown in Equation [13].

$$C_i(p_1 ... p_m) = p_i / (p_1 + p_2 + ... + p_m) \quad [13]$$

The purpose of a controlling function $C_i$ is to provide a large number (close to 1) if the $i^{th}$ element of the parameters $p_1 ... p_m$ is high relative to the other parameters, and a small value (close to 0) if the $i^{th}$ element of the parameters $p_1 ... p_m$ is relatively low, and to "down-scale" a tuple of m elements so that their sum is 1.0, while the relations between the elements of the m-tuple are constrained. If the Controlling Functions are applied to a set of m Inverse Differences, the m results of the Controlling Functions will be referred to as "Controlled Inverse Differences" later in this disclosure.

Setting the Elements F, R and A

The following section describes the manner in which the user-defined (or otherwise defined) m IRPs can be converted into its associated Performing Functions F and tuples R.

Note: In contrary to F and R, the last four elements of the tuple (A, D, V, C) are functions that are defined by the programmer when a system using IRPs is created, and are predefined or only slightly adjustable by the user. However, to a certain extent, a system may give the user control over the functions A, D, V and C; and there can be certain components of the first two elements $F_{1...m}$ and $R_{1...m}$ that will be set by the application without user influence. This will become clearer later in this disclosure.

Figure 4:
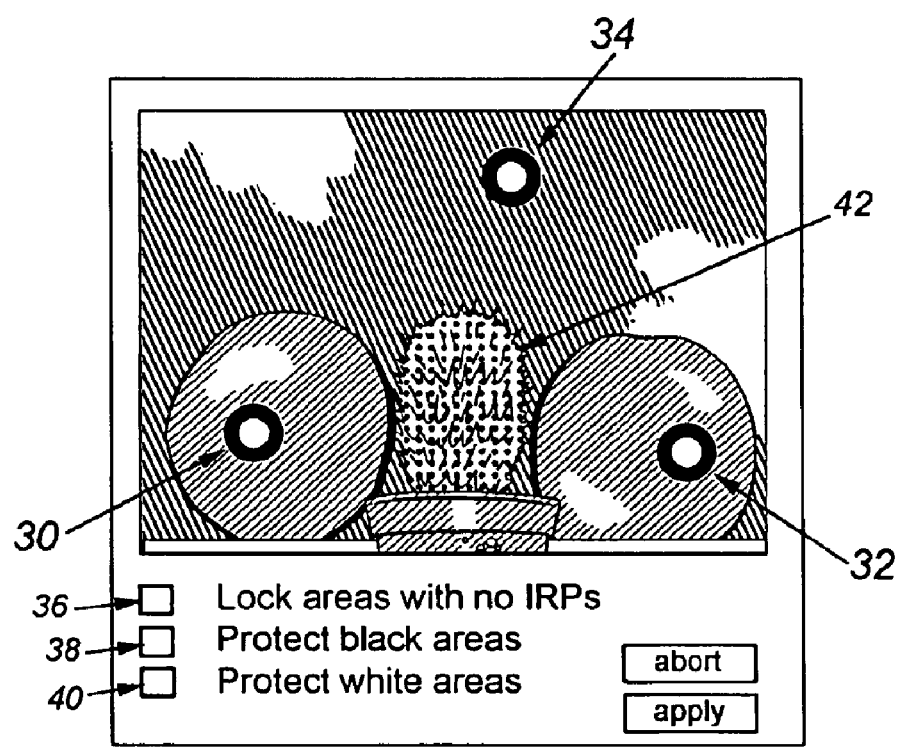
FIG. 4 is an illustration of one embodiment of a dialog box useable in the application program interface of the present invention.

FIG. 4 provides a sample image of an image in a dialog box an image processing program, for the purposes of illustrating modifications to an image using the current invention. For example, graphic tag 30 representing IRP $R_1$ in FIG. 4, placed on the left apple, will be to increase saturation, graphic tag 32 representing IRP $R_2$, placed on the right apple, will be decrease saturation, and graphic tag 34 representing IRP $R_3$, placed on the sky, will darken its associated image component.

To do so, three performing functions $F_1 ... F_3$ are necessary, where $F_1$ increases the saturation, $F_2$ decreases the saturation, and $F_3$ is an image darkening image modification.

The system should typically allow the user to set such a Performing Function before or after the user places an IRP in the image. In such cases, the user first defines the type of the performing function (such as "sharpen," or "darken," or "increase saturation," etc.) and then the user defines the behavior of the function (such as "sharpen to 100%," or "darken by 30 levels," etc.).

In the current example, three tuples $R_1 ... R_3$ are necessary. For each IRP, there is always one tuple R and one Performing Function F. It is not necessary, however, that all Performing Functions are different. As previously disclosed, IRPs in the current invention are used to store Characteristics of an individual pixel or a particular area in an image. As such, using the current example of modifying FIG. 4, three IRPs are necessary: an IRP that stores the Characteristics of the first apple, an IRP that stores the Characteristics of the second apple, and an IRP that stores the Characteristics for the sky.

This can typically be done by reading the Characteristics of the image location where the user has placed an IRP. If a user has placed an IRP on the image coordinate location x, y in the image I, the values of $R = ((g_1 ... g_n), g^*, (w_1 ... w_n))$ can be calculated as follows:

$g_1 ... g_n = A_1(I,x,y) ... A_n(I,x,y)$ $g^* = 0$ $w_1 ... w_n$ = default value, for example, 1. [14]

The user may have control over the values of R after they were initially filled. This control may be allowed to varying extents, such as weights only versus all variables.

In our example the two red apples will be modified differently. Presumably, both apples have the same color and the same structure, and each only differs in its location. The sky, containing the third IRP, has a different location than the apples, and also a different color.

As we now see that both location and color are relevant for differentiating between the three relevant image areas, it will be obvious that what is needed is at least one or more Location Analyzing Functions and one or more Color Analyzing Functions. In cases where the application allows the user only to perform global color changes, it would be sufficient to choose only Color Analyzing Functions.

Some Analyzing Functions are as follows, where $I_{xy(r)}$ refers to the red channel's value of the image I at the location x,y and so forth.

$A_1(I,x,y) = x$ [15a]

$A_2(I,x,y) = y$ [15b]

$A_3(I,x,y) = I_{xy(r)}$ [15c]

$A_4(I,x,y) = I_{xy(g)}$ [15d]

$A_5(I,x,y) = I_{xy(b)}$ [15e]

$A_1$ and $A_2$ are Location Analyzing Functions and $A_3$ through $A_5$ are Color Analyzing Functions.

Note: $A_3$ through $A_5$, which only provide the red, green, and blue values, are suitable functions for a set of color-dependent analytical functions. For even better performance it is recommended to derive functions that calculate luminosity, saturation, etc., independently. Using the channels of the image in Lab color mode is appropriate. However, the following Analyzing Functions are also examples of appropriate Analyzing Functions, where the capitalized variables X, Y, R, G, B represent the maximum possible values for the coordinates or the color channels.

$A_1(I,x,y) = x*100/X$ [16a]

$A_2(I,x,y) = y*100/Y$ [16b]

$A_3(I,x,y) = (I_{xy(r)} + I_{xy(g)} + I_{xy(b)}) * 100/(R+G+B)$ [16c]

$$A_4(I,x,y)=100*(I_{xy(r)}-I_{xy(g)})/(R+G)+50 \quad [16d]$$

$$A_5(I,x,y)=100*(I_{xy(r)}-I_{xy(b)})/(R+B)+50 \quad [16e]$$

Equations [16] shows Analyzing Functions that are also normalized to a range of 0 . . . 100 (see the description for normalizing Analyzing Functions after equation [4]) Normalizing the Analyzing Functions aids in the implementation, as normalized Analyzing Functions have the advantage that their results always have the same range, regardless of the image size or other image characteristics. The Analyzing Functions found in Equations [15] will be used throughout this disclosure when discussing values from $R_1 \ldots m$.

Note: It may not be useful to adjust the set of Analyzing Functions from image to image. It may be preferable to use one set of Analyzing Functions that is suitable for many or all image types. When the current invention is used for standard color enhancements, the Analyzing Functions of Equations [16] are good to start with.

A Closer Look at IRPs

As previously discussed in this disclosure, the tuples R of an IRP store the information of the Characteristics of the region to which an operation will be applied, the region of interest. These tuples R acquire the Characteristics typically by applying the n analytical functions to the image location $I_{xy}$ where the IRP was placed, as in equation [14].

In the current embodiment, the Difference Function D* will compare the values $g_1 \ldots g_n$ of each IRP to the results of the n Analyzing Functions for all pixels in the image, using the weights $w_1 \ldots w_n$.

For example, if the pixel in the middle of the left apple has the coordinates (10, 100) and the RGB color 150, 50, 50 (red), then the Analyzing Functions $A_1 \ldots A_n$ of this pixel will have the values $A_1=10$, $A_2=100$, $A_3=150$, $A_4=50$, $A_5=50$, therefore, the values $g_1 \ldots g_n$ will be set to (10, 10, 150, 50, 50).

g* is set to zero for this IRP.

The weights will control the significance of the individual elements of $g_1 \ldots g_5$. See Equations [6], [7] and [8]. For example, if the weights $w_1 \ldots w_5$ are set to (10,10,1,1,1), the location related information, gained through $A_1$ and $A_2$, will be more significant than the color related information from $A_3$ through $A_5$. (This IRP would be more location dependent than color dependent).

If, however, $w_1 \ldots w_5=(0,0,3,3,0)$ is set, only the red and green channels of the pixel information would be considered by the Difference Function, and the IRP would not differentiate between the location of a pixel or its blue channel. As previously mentioned, in FIG. 4 the location-dependent and color-dependent Characteristics play a role in differentiating the apples from each other and from the sky. Therefore, we will use equal weights for all 5 characteristics.

Setting all weights all to 1, the first IRP would be:

$R_1=(g_1 \ldots g_5, g^*, w_1 \ldots w_5)=((10,100,150,50,50), 0, (1,1,1,1,1))$ (the first apple at the coordinate 10,100 with the color 150,50,50)

The second and third IRP could have values such as $R_2=((190,100,150,50,50), 0 (1,1,1,1,1))$ (the second apple at the coordinate 190,100 with the color 150,50,50)

$R_3=((100,10,80,80,200), 0, (1,1,1,1,1))$.

(the sky at the coordinate 100,10 with the color 80,80, 200)

The Mixing Function

An abbreviation related to the Difference Function follows. The purpose of the Difference Function is to calculate a value that indicates how "different" a pixel in the image is from the Characteristics that a certain IRP is associated with.

The "Difference" between an IRP $R=((g_1 \ldots g_n), g^*, (w_1 \ldots w_n))$ and a pixel $I_{xy}$ can be written as follows:

$$|R-I_{xy}|=D^*((g_1 \ldots g_n), (A_1(I,x,y), \ldots, A_n(I,x,y)), (w_1, \ldots, w_n), g^*) \quad [17]$$

The Difference referred to in this embodiment is always the result of the Difference function, and should not be confused with the "spatial" distance between two pixels in an image.

If, for ease of implementation or for faster computing of the Mixing Function, the Difference Functions D, $\overline{D}$ or $\overline{D}^*$ are used, the abbreviation would be:

$$|R-I_{xy}|=D((g_1 \ldots g_n), (A_1(I,x,y), \ldots, A_n(I,x,y)), (w_1, \ldots, w_n)) \quad [18]$$

$$|R-I_{xy}|=\overline{D}((g_1 \ldots g_n), (A_1(I,x,y), \ldots, A_n(I,x,y))) \quad [19]$$

$$|R-I_{xy}|=\overline{D}^*((g_1 \ldots g_n), (A_1(I,x,y), \ldots, A_n(I,x,y)),g^*) \quad [20]$$

Given the 7-tuple of an IRP based image modification $(F_{1 \ldots m}, R_{1 \ldots m}, A_{1 \ldots n}, D, V, C)$ then the modified image $I^*_{xy}$ is as show in Equation [21].

$$I^*_{xy} = \sum_{i=1}^{m} F_i(I, x, y) * C_i(V(|R_1 - I_{xy}|), \ldots, V(|R_m - I_{xy}|)) \quad [21]$$

Apply this equation to each pixel in the image I, to receive the processed image I*, where all Performing Functions were applied to the image according to the IRPs that the user has set. This equation compares the n Characteristics of each pixel x, y against all IRPs, and applies those Performing Functions $F_i$ to a greater extent to the pixel, whose IRPs have similar Characteristics, while the Controlling Function ensures that the sum of all functions $F_i$ does not exceed unwanted ranges.

In an even further preferred embodiment of the current invention, equation [22] would be used.

$$I^*_{xy} = I_{xy} + \sum_{i=1}^{m} \Delta F_i(I, x, y) * V(|R_i - I_{xy}|) \quad [22]$$

In contrast to equation [21], equation [22] requires that the Inversion Function V does not exceed values of approximately 1. The Gaussian Bell curve $V(x)=e^{-x^2}$ or $1/(x+1)$ or equation [12] could be such functions. The function $\Delta F$ expresses the difference between the original and modified image (where $I'_{xy}=I_{xy}+\Delta F(I, x, y)$ instead of $I'_{xy}=F(I, x, y)$, see Equation 2).

When comparing Equation [21] and [22], the terms $V(|R_i-Ixy|)$ represent the Inverse Difference of the currently processed tuple $R_i$ and the pixel $I_{xy}$. Only equation [21] uses Controlled Inverse Differences. If equation [21] is used, each pixel in the image will be filtered with a 100% mix of all Performing Functions, regardless if an image region contains a large or a small number of IRPs. The more IRPs that are positioned in the image, the less effect an individual IRP will have if Equation [21] is used. If Equation [22] is used, the IRPs will not show this competitive nature. That is, each IRP will modify the image to a certain extent regardless whether it is placed amidst many other IRPs or not. Therefore, if Equation [22] is used, placing multiple IRPs in an image area will increase the total amount of image modification in this area.

Further Embodiments

In a further embodiment, the concept of "Abstract IRPs" can be used to enhance the performed image modification, or to change the behavior of the image modification.

Abstract IRPs are similar to other IRPs as they are pairs of a Performing Function F and a set of values R. Both Abstract IRPs and IRPs may be used together to modify an image. Abstract IRPs, however, are not "user defined" IRPs or IRPs that are placed in the image by the user. The function of an Abstract IRP can be to limit the local "effect" or intensity of an IRP. In this regard, Abstract IRPs are typically not "local", i.e., they affect the entire image. Abstract IRPs can be implemented in a manner that the user turns a user-controlled element on or off as illustrated later, so that the Abstract IRPs are not presented as IRPs to the user, as shown in FIG. 4.

Note: The use of Abstract IRPs as disclosed below requires that equation [21] is implemented as the mixing function, and that the Difference function is implemented as shown in equation [17] or [20].

In FIG. 4 the user has positioned graphic tags 30, 32, and 34 representing IRPs $R_1 \ldots R_3$. Controls 36, 38, and 40 indicate a set of three possible user controls. When control 36 is used, the application would use one additional pre-defined Abstract IRP in the image modification. Such pre-defined, Abstract IRPs could, for example, be IRPs $R_4$ through $R_6$ as described below.

When the check box in control 36 is enabled, Abstract IRP $R_4$, is utilized. Without the use of an Abstract IRP, when an image has an area such as the cactus 42 which is free of IRPs, this area will still be filtered by a 100% mix of the effects of all IRPs (see equation [19] and the Controlling Function C). In the current image example, the cactus 42 would be affected by a mix of the IRPs $R_1 \ldots R_3$, although the user has placed no IRP on the cactus.

To remedy this, Abstract IRP $R_4$ is utilized which makes use of the g* value. Note: g* is used as described below when the mixing function of equation [21] is being implemented.

The Abstract IRP could have zero weights and a g* value greater than zero, such as $R_4$=((0,0,0,0,0), 50, (0,0,0,0,0))

The Difference Function $|R_4-I_{xy}|$ will return nothing but 50 whatever the Characteristics of the pixel $I_{xy}$ might be. The value of g* should be in the range of 1 to 1000. 50 is a good value to start with.

The purpose of this IRP and its $R_4$ is that pixels in areas free of IRPs, such as in the middle of the cactus 42, will have a lower Difference to $R_4$ (which is constantly set to 50) than to $R_1 \ldots R_3$. For pixels in image areas where one or more IRPs are set, $R_4$ will not be the IRP with the lowest Difference, as a different IRP will likely have a lower Difference. In other words: areas free of non-Abstract IRPs are controlled predominantly by $R_4$, and areas that do contain non-Abstract IRPs will be affected to a lesser extent by $R_4$. If the Performing Function $F_4$ is set to a function that does not change the image ($F_4$(I,x,y)=Ixy), $R_4$ ensures that areas free of IRPs will remain mainly unaffected.

In order to make Abstract IRP $R_4$ more effective (i.e., IRPs $R_1 \ldots R_3$ less effective), g* can be lowered, and the value g* in $R_4$ can be raised to make the "active" IRPs $R_1 \ldots R_3$ more effective. A fixed value for g* in $R_4$ may be implemented if the system that is programmed is designed for image retouchers with average skills for example, and applications designed for advanced users may permit the user to change the setting of g*.

In an even further embodiment of the current invention, Abstract IRPs could be used whereby an IRP has weights equaling zero for the location dependent parameters, and values for $g_1 \ldots g_n$ which would represent either black or white, combined with a Performing Function which does not affect the image.

Two of such Abstract IRPs—one for black, one for white—would be suitable to ensure that black and white remain unaffected. Such Abstract IRPs could be:

$R_5$=((0,0,255,255,255), 0, (0,0,1,1,1))

$R_6$=((0,0,0,0,0), 0, (0,0,1,1,1))

As with $R_4$ and $F_4$, the Performing Functions $F_5$ and $F_6$ would also be functions that do not perform any image modification, so the IRPs 5 and 6 would ensure that colors such as black and white remain mainly unaffected by the IRPs that the user places.

As shown in control 38 and control 40, these Abstract IRPs can be implemented providing the user with the ability to turn checkboxes or similar user controls on or off. Such checkboxes control the specified function that the Abstract IRPs would have on the image. When the associated checkbox is turned on, the application uses this Abstract IRP This process is referred to as "load abstract IRPs" in step 18 of FIG. 3.

It is not necessary that all Abstract IRPs are associated with a Performing Function that leaves the image unaffected. If for instance an implementation is programmed that allows the user to sharpen the image, an abstract IRP such as $R_4$ above can be implemented, where the associated Performing Function F4 sharpens the image to 50%. The user could then place IRPs whose Performing Functions sharpen the image to for instance to 0%, 25%, 75% or 100% in the image. This would mean that the image is sharpened to an individual extent where the user has set IRPs, and to 50% anywhere else.

In an even further embodiment, the IRP based image modification can be used in combination with a further, global image modification I'$_{xy}$=M(I, x, y), where M is an image filter, combining the IRP based image modification and the uniform image modification M as shown in Equation [23].

$$I^*_{xy} = M\left(I_{xy} + \sum_{i=1}^{m} \Delta F_i(I, x, y) * V(|R_i - I_{xy}|)\right) \quad [23]$$

Equation [23] is derived from equation [21]. Equation [22] could also be utilized for this embodiment. The current embodiment is useful for a variety of image filter types M, especially those that lead to unwanted image contrast when applied, causing what is known to those skilled in the art as "blown-out areas" of a digital image. Such image filters M could be color to black and white conversions, increasing the overall contrast, inverting the image, applying a strong stylistic effect, a solarization filter, or other strong image modifications.

Applying such an image modification such as a color to black and white conversion without the current invention, the user would first convert the image to black and white, inspect areas of the resulting black and white image that are too dark or too bright, then undo the image modification, make changes to the original image to compensate for the filter application, and then re-apply the image modification, until the resulting image no longer has the unwanted effects.

While implementing this filter in combination with an IRP based image modification as shown in Equation [23], the user can modify contrast and color of the image as the image modification M is applied, such as in the example of the black and white conversion, thus accelerating the method of application by the user for the black and white conversion process and providing improved results.

In an even further embodiment, the Performing Functions $F_i$ can be replaced with "Offset Vectors" $S_i=(\Delta x_i, \Delta y_i)^T$, where $S_{1 \ldots m}$ are the m Offset Vectors associated with the m IRPs, and $\Delta x$ and $\Delta y$ are any real numbers. In this case, the user would define such an Offset Vector of an IRP for instance by defining a direction and a length, or by dragging an IRP symbol with a mouse button different from the standard mouse button. The mixing function, for instance if derived from equation [21], would then be $$S_{xy} = \sum_{i=1}^{m} S_i * C_i(V(|R_1 - I_{xy}|), \ldots, V(|R_m - I_{xy}|)) \quad [24]$$

Of course, as the result of this function is assembled of vectors of $\mathbb{R}^2$, the result is a matrix $S_{xy}$ of the same horizontal and vertical dimensions as the image, whose elements are vectors with two elements. For further reference, I refer to this matrix as an "Offset Matrix".

Using this implementation, the user can easily attach IRPs to regions in the image and at the same time define in which directions the user wants these regions to be distorted or altered.

The result of the mixing function is an offset matrix that contains information relating to in which direction a pixel of the original image I needs to be distorted to achieve the distorted image $I^d$. The benefit of calculating the Offset Matrix this way is that the Offset Matrix adapts to the features of the image, provided that the vectors $R_{1 \ldots m}$ have weights other than zero for pixel luminosity, chrominance, and structure Characteristics. The image $I^d$ can be calculated the following way:

(1) Reserve some memory space for $I^d$, and flag all of its pixels.
(2) Select the first coordinate (x,y) in I.
(3) Write the values (such as r,g,b) of the pixel $I_{xy}$ into the picture $I^d$ at the location (x,y)+$S_{xy}$, and un-flag the pixel at that location in $I^d$.
(4) Unless all pixels in I are considered, select next coordinate (x,y) and proceed with step (3).
(5) Select first pixel in $I^d$ that is still flagged.
(6) Assign the values (such as r,g,b) of the closest non-flagged pixel to this pixel. If multiple non-flagged pixels are equally close, select the values of that pixel that was created using the lowest Offset Vector $S_{xy}$.
(7) If flagged pixels are left, select next flagged pixel in $I^d$ and proceed with step (6).

In other words, copy each pixel from I into $I^d$ while using the elements of the Offset Matrix S for offsetting that pixel. Those areas that remain empty in $I^d$ shall be filled with the pixel values neighbored to the empty area in $I^d$, while values of pixels that were moved to the least extent during the copy process shall be preferred.

In a further embodiment, a plurality or IRPs can be saved and applied to one or more different images. In batch processing applications, this plurality of IRPs can be stored and applied to multiple images. In such an embodiment, it is important that IRPs whose weights for location-dependent characteristics are zero.

In a further embodiment, the user may be provided with simplified control over the weights of an IRP by using a unified control element. In Equations [15] and Equations [16], five Characteristics are utilized, two of which are location dependent Characteristics sourcing from Location Analyzing Functions.

In creating such a unified control element, one control element controls these two weights. This unified control element could be labeled "location weight," instead of the two elements "horizontal location weight" and "vertical location weight."

In a further embodiment, user control elements may be implemented that display different values for the weights as textual descriptions instead of numbers, as such numbers are often confusing to users. Those skilled in the art will recognize that it may be confusing to users that low values for weights lead to IRPs that have more influence on the image, and vice versa. Regarding weights for location-dependent Characteristics (such as $w_1$ and $w_2$ in the current example), the user could be allowed to choose one out of five pre-defined weights for textual descriptions of different values for the location dependent weights $w_1$ and $w_2$ as show in Table 1.

TABLE 1

|  | $w_1$ | $w_2$ |
|---|---|---|
| "global" | 0 | 0 |
| "almost global" | 0.3 | 0.3 |
| "default" | 1 | 1 |
| "local" | 3 | 3 |
| "very local" | 8 | 8 |

Figure 5:
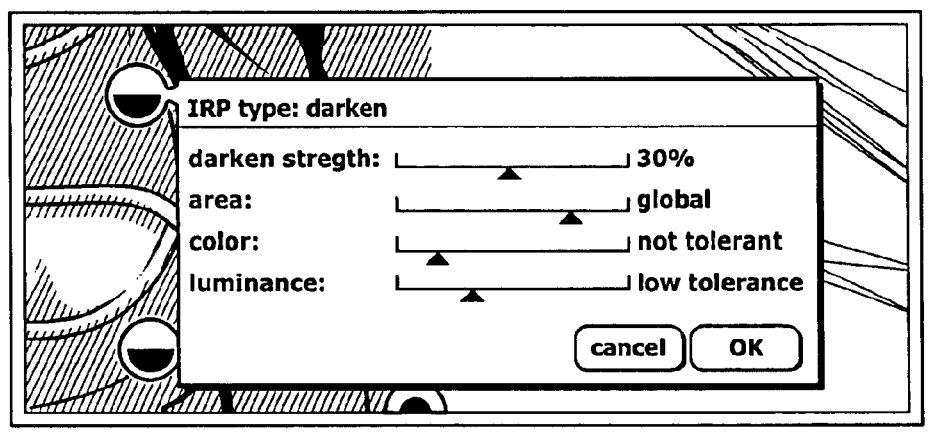
FIG. 5 is an illustration of one embodiment of a dialog box implementing simplified user control over weights useable in the application program interface of the present invention.

FIG. 5 illustrates how such simplified user control over weights may be implemented in an image processing program.

In a further embodiment, the user control over weights could be simplified to such an extent that there are only two types of weights for IRPs that the user can choose from: "strong" that utilizes weight vectors such as (1,1,1,1,1) and "weak" that utilizes weight vectors such as (3,3,3,3,3). Note: As mentioned before, large weights make the area that an IRP has influence on smaller, and vice versa.

For example, the user may place IRPs in the sky with an associated enhancement to increase the saturation of an area identified by one or more IRPs. In the same image, the user may place additional IRPs with an assigned function to decrease contrast, identifying changes in contrast and the desired changes in contrast based on the location of each individual IRP. In a preferred embodiment, IRPs may include a function that weights the intensity of the image-editing function as indicated by the user.

In a different implementation of the invention, IRPs could be placed to identify a color globally across the image, and using an associated command, increase the saturation of the identified color.

In a still further preferred embodiment, IRPs could be used to provide varying degrees of sharpening across a digital image. In such an implementation, multiple IRP's could be placed within specific image regions or image characteristics, such as the eyes, the skin, and hair of a portrait, and different sharpening intensities assigned to each IRP and applied to the digital image while considering the presence of color and/or contrast and the relative difference of each IRP from one another to provide the desired image adjustment.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

This invention is not limited to particular hardware described herein, and any hardware presently existing or developed in the future that permits processing of digital images using the method disclosed can be used, including for example, a digital camera system.

A computer readable medium is provided having contents for causing a computer-based information handling system to perform the steps described herein, and to display the application program interface disclosed herein.

The term memory block refers to any possible computer-related image storage structure known to those skilled in the art, including but not limited to RAM, Processor Cache, Hard Drive, or combinations of those, including dynamic memory structures. Preferably, the methods and application program interface disclosed will be embodied in a computer program (not shown) either by coding in a high level language, or by preparing a filter which is complied and available as an adjunct to an image processing program. For example, in a preferred embodiment, the methods and application program interface is compiled into a plug-in filter that can operate within third party image processing programs such as Adobe Photoshop®.

Any currently existing or future developed computer readable medium suitable for storing data can be used to store the programs embodying the afore-described interface, methods and algorithms, including, but not limited to hard drives, floppy disks, digital tape, flash cards, compact discs, and DVDs. The computer readable medium can comprise more than one device, such as two linked hard drives. This invention is not limited to the particular hardware used herein, and any hardware presently existing or developed in the future that permits image processing can be used.

Any currently existing or future developed computer readable medium suitable for storing data can be used, including, but not limited to hard drives, floppy disks, digital tape, flash cards, compact discs, and DVDs. The computer readable medium can comprise more than one device, such as two linked hard drives, in communication with the processor.

A method for image processing of a digital image has disclosed comprising the steps of determining one or more sets of pixel characteristics; determining for each pixel characteristic set, an image editing function; providing a mixing function algorithm embodied on a computer-readable medium for modifying the digital image; and processing the digital image by applying the mixing function algorithm based on the one or more pixel characteristic sets and determined image editing functions. In one embodiment, the mixing function algorithm comprises a difference function. Optionally, the difference function algorithm calculates a value based on the difference of between pixel characteristics and one of the one or more determined pixel characteristic sets. In another embodiment, the mixing function algorithm includes a controlling function for normalizing the calculations.

In a further embodiment, the method adds the step of determining for each pixel characteristic set, a set of weighting values, and the processing step further comprises applying the mixing function algorithm based on the determined weighting value set.

In a further embodiment, a first pixel characteristic set is determined, and at least one characteristic in the first pixel characteristic set is location dependent, and at least one characteristic in the first pixel characteristic set is either color dependent, or structure dependent, or both. Alternatively, a first pixel characteristic set is determined, and at least two different characteristics in the first pixel characteristic set are from the group consisting of location dependent, color dependent, and structure dependent.

A method for processing of a digital image has been disclosed, comprising the steps of receiving the coordinates of one or more than one image reference point defined by a user within the digital image; receiving one or more than one image editing function assigned by the user and associated with the coordinates of the one or more than one defined image reference point; providing a mixing function algorithm embodied on a computer-readable medium for modifying the digital image; and processing the digital image by applying the mixing function algorithm based on the one or more than one assigned image editing function and the coordinates of the one or more than one defined image reference point. The method may optionally further comprise displaying a graphical icon at the coordinates of a defined image reference point.

A mixing function algorithm suitable to the invention has been described, and exemplar alternative embodiments are disclosed, including a group consisting of a Pythagoras distance approach which calculates a geometric distance between each pixel of the digital image to the coordinates of the one or more than one defined image reference point, a color curves approach, a segmentation approach, a classification approach, an expanding areas approach, and an offset vector approach. Optionally, the segmentation approach comprises multiple segmentation, and additionally optionally the classification approach adjusts for similarity of pixel attributes. The mixing function algorithm may optionally operate as a function of the calculated geometric distance from each pixel of the digital image to the coordinates of the defined image reference points.

Optionally, the disclosed method further comprises receiving one or more assigned image characteristics associated with the coordinates of a defined image reference point, and wherein the mixing function algorithm calculates a characteristic difference between the image characteristics of a pixel of the digital image and the assigned image characteristics. The mixing function algorithm may also calculate a characteristic difference between the image characteristics of a pixel and the image characteristics of one or more pixels neighboring the coordinates of one or more defined image reference point.

Additionally, optionally other steps may be added to the method. For example, the method may further comprise receiving one or more weighting values, and the processing step further comprising applying the mixing function algorithm based on weighting values; or further comprise receiving one or more regions of interest associated with the coordinates of one or more defined image reference point; or further comprise the step of providing an application program interface comprising a first interface to receive the coordinates of the one or more defined image reference points, and a second interface to receive the one or more assigned image editing functions.

A method for processing of a digital image comprising pixels having image characteristics has been disclosed comprising the steps defining the location of image reference points within the digital image; determining image editing functions; and processing the digital image by applying the determined image editing functions based upon either the location of the defined image reference points, or the image characteristics of the pixels at the location of the defined image reference points, or both.

A method for image processing of a digital image has also been disclosed comprising the steps of providing one or more than one image processing filter; setting the coordinates of one or more than one image reference point within the digital image; providing a mixing function algorithm embodied on a computer-readable medium for modifying the digital image; and processing the digital image by applying the mixing algorithm based on the one or more than one image processing filter and the coordinates of the one or more than one set image reference point. Optionally, various filters may be used, including but not limited to a noise reduction filter, a sharpening filter, or a color change filter.

Also, any element in a claim that does not explicitly state "means for" performing a specified function or "step for" performing a specified function, should not be interpreted as a "means" or "step" clause as specified in 35 U.S.C. § 112.

I claim:

1. A method for image processing of a digital image comprising the steps of:
   providing one or more than one image processing filter;
   setting the coordinates of one or more than one image reference point within the digital image;
   providing a mixing function algorithm embodied on a computer-readable medium for modifying the digital image; and
   processing the digital image by applying the mixing function algorithm based on the one or more than one image processing filter and the coordinates of the one or more than one set image reference point.

2. The method of claim 1, wherein the one or more than one image processing filter is a noise reduction filter.

3. The method of claim 1, wherein the one or more than one image processing filter is a sharpening filter.

4. The method of claim 1, wherein the one or more than one image processing filter is a color change filter.

5. A method for image processing of a digital image comprising the steps of:
   determining one or more sets of pixel characteristics;
   determining for each pixel characteristic set, an image processing filter;
   providing a mixing function algorithm embodied on a computer-readable medium for modifying the digital image; and
   processing the digital image by applying the mixing function algorithm based on the one or more pixel characteristic sets and determined image processing filter.

6. The method of claim 5, wherein the mixing function algorithm comprises a difference function.

7. The method of claim 6, wherein the difference function algorithm calculates a value based on the difference of between pixel characteristics and one of the one or more determined pixel characteristic sets.

8. The method of claim 5, further comprising the step of determining for each pixel characteristic set, a set of weighting values, and the processing step further comprises applying the mixing function algorithm based on the determined weighting value set.

9. The method of claim 5, wherein the mixing function algorithm includes a controlling function for normalizing the calculations.

10. The method of claim 5, wherein a first pixel characteristic set is determined, and at least one characteristic in the first pixel characteristic set is location dependent, and at least one characteristic in the first pixel characteristic set is either color dependent, or structure dependent, or both.

11. The method of claim 5, wherein a first pixel characteristic set is determined, and at least two different characteristics in the first pixel characteristic set are from the group consisting of location dependent, color dependent, and structure dependent.

12. A method for processing of a digital image comprising the steps of:
   receiving the coordinates of one or more than one image reference point within the digital image;
   receiving an assignment of one or more than one image processing filter, the filter being associated with the coordinates of the one or more than one defined image reference point;
   providing a mixing function algorithm embodied on a computer-readable medium for modifying the digital image; and
   processing the digital image by applying the mixing function algorithm based on the one or more than one assigned image processing filter and the coordinates of the one or more than one defined image reference point.

13. The method of claim 12, further comprising displaying a graphical icon at the coordinates of a defined image reference point.

14. The method of claim 12, the digital image comprising pixels, wherein the mixing function algorithm calculates a geometric distance between each pixel of the digital image to the coordinates of the one or more than one defined image reference point.

15. The method of claim 14, the mixing function algorithm operating as a function of the calculated geometric distance from each pixel of the digital image to the coordinates of the one or more than one defined image reference point.

16. The method of claim 12, the digital image comprising pixels having image characteristics, further comprising receiving one or more assigned image characteristics associated with the coordinates of one or more defined image reference point, and wherein the mixing function algorithm calculates a characteristic difference between the image characteristics of a pixel of the digital image and the one or more assigned image characteristics.

17. The method of claim 12, further comprising receiving one or more weighting values, and the processing step further comprising applying the mixing function algorithm based on weighting values.

18. The method of claim 12, further comprising receiving one or more regions of interest associated with the coordinates of one or more defined image reference point.

19. The method of claim 12, the digital image comprising pixels having image characteristics, wherein the mixing function algorithm calculates a characteristic difference between the image characteristics of a pixel and the image characteristics of one or more pixels neighboring the coordinates of one or more defined image reference point.

20. The method of claim 12, further comprising the step of providing an application program interface comprising a first interface to receive the coordinates of the one or more defined image reference points, and a second interface to receive the assignment of the one or more image processing filters.

21. The method of claim 12, wherein the mixing function algorithm is selected from a group consisting of a Pythagoras distance approach, a color curves approach, a segmentation approach, a classification approach, an expanding areas approach, and an offset vector approach.

22. The method of claim 21, wherein the segmentation approach comprises multiple segmentation.

23. The method of claim 21, the digital image comprising pixels having attributes, wherein the classification approach adjusts for similarity of pixel attributes.

24. A method for processing of a digital image, the digital image comprising pixels having image characteristics comprising the steps:
defining the location of image reference points within the digital image;
determining image processing filters; and
processing the digital image by applying the determined image processing filters based upon either the location of the defined image reference points, or the image characteristics of the pixels at the location of the defined image reference points, or both.

25. An application program interface embodied on a computer-readable medium for execution on a computer for image processing of a digital image, the digital image comprising pixels having image characteristics, comprising:
a first interface to receive the coordinates of an image reference point defined by a user within the digital image, and
a second interface to receive an assignment of an image processing filter by the user, the filter being associated with both the coordinates of the defined image reference point, and the image characteristics of one or more pixels neighboring the coordinates of the defined image reference point.

26. The program interface of claim 25, further comprising a third interface that displays a graphical icon at the coordinate defined image reference point.

27. The program interface of claim 26, wherein the third interface permits repositioning of the graphical icon.

28. The program interface of claim 25, further comprising a fourth interface that identifies the assigned image processing filter.

29. The program interface of claim 25, wherein the second interface is further to receive one or more than one parameter representing a weighting value.

30. An application program interface embodied on a computer-readable medium for execution on a computer for image processing of a digital image, the digital image comprising pixels having image characteristics, comprising:
a first interface to receive the coordinates of each of a plurality of image reference points defined by a user within the digital image, and
a second interface to receive an assignment of an image processing filter by the user, the filter being associated with either the coordinates of each of the plurality of defined image reference points, or the image characteristics of one or more pixels neighboring the coordinates of each of the plurality of defined image reference points.

31. The program interface of claim 30, wherein the assigned image processing filter is associated with both the coordinates of each of the plurality of defined image reference points and the image characteristics of one or more pixels neighboring the coordinates of each of the plurality of defined image reference points.

32. The program interface of claim 30, further comprising a third interface that displays a graphical icon at the coordinates of one or more than one of the plurality of defined image reference points.

33. The program interface of claim 32, wherein the third interface permits repositioning of the graphical icon.

34. The program interface of claim 30, further comprising a fourth interface that identifies the assigned image processing filter.

35. The program interface of claim 30, wherein the second interface is further to receive one or more than one parameter representing a weighting value.

36. A computer readable medium having contents for causing a computer-based information handling system to perform the steps of:
providing one or more than one image processing filter;
receiving the coordinates of one or more than one point within the digital image and setting the coordinates of one or more than one image reference point based upon the received coordinates;
providing a mixing function algorithm for modifying the digital image; and
processing the digital image by applying the mixing function algorithm based on the one or more than one image processing filter and the coordinates of the one or more than one set image reference point.

37. The computer readable medium of claim 36, wherein the one or more than one image processing filter is a noise reduction filter, a sharpening filter, or a color change filter.

38. A system for processing digital images, comprising the computer readable medium of claim 36 and a compute-based information handling system.

39. The system of claim 38, wherein the computer-based information handling system comprises a digital camera.

* * * * *